United States Patent
Wilson et al.

(10) Patent No.: US 11,062,298 B2
(45) Date of Patent: *Jul. 13, 2021

(54) CONTACTLESS ENABLEMENT AND DISABLEMENT

(71) Applicant: Visa International Service Association, San Francisco, CA (US)

(72) Inventors: David William Wilson, Camberley (GB); Omar Rifaat, London (GB); Hao Ngo, San Jose, CA (US)

(73) Assignee: Visa International Service Association, San Francisco, CA (US)

(*) Notice: Subject to any disclaimer, the term of this patent is extended or adjusted under 35 U.S.C. 154(b) by 167 days.

This patent is subject to a terminal disclaimer.

(21) Appl. No.: 16/205,699

(22) Filed: Nov. 30, 2018

(65) Prior Publication Data

US 2019/0095904 A1 Mar. 28, 2019

Related U.S. Application Data

(63) Continuation of application No. 14/846,378, filed on Sep. 4, 2015, now Pat. No. 10,185,952, which is a (Continued)

(51) Int. Cl.
*G06Q 20/34* (2012.01)
*G06Q 20/20* (2012.01)
(Continued)

(52) U.S. Cl.
CPC ..... *G06Q 20/352* (2013.01); *G06K 19/07336* (2013.01); *G06Q 20/204* (2013.01);
(Continued)

(58) Field of Classification Search
CPC ..... G06Q 20/352; G06Q 20/341; G06Q 20/20
(Continued)

(56) References Cited

U.S. PATENT DOCUMENTS 5,828,044 A 10/1998 Jun et al.
6,161,762 A 12/2000 Bashan et al.
(Continued)

FOREIGN PATENT DOCUMENTS

AU 2010257039 B2 7/2014
CN 102460521 B 7/2014
(Continued)

OTHER PUBLICATIONS

U.S. Appl. No. 61/173,471, filed Apr. 28, 2009, by Cowen et al.
(Continued)

*Primary Examiner* — Luna Champagne
(74) *Attorney, Agent, or Firm* — Kilpatrick Townsend & Stockton LLP (57) ABSTRACT

Devices, systems, and methods for controlling a contactless interface on a dual interface portable device are provided. The methods allow for contactless enablement and disablement on both a temporary and semi-permanent basis, dependent on commands sent to the device by an issuer of the portable device. The commands are received through a terminal device and are transferred to the portable device during a contact transaction. Configuration data on the portable device is modified according to the received commands. An application on the portable device controls the transmission of data through the contactless interface dependent on the configuration data.

20 Claims, 7 Drawing Sheets

Related U.S. Application Data continuation of application No. 13/684,754, filed on Nov. 26, 2012, now Pat. No. 9,160,416, which is a continuation of application No. 12/768,677, filed on Apr. 27, 2010, now Pat. No. 8,320,962.

(60) Provisional application No. 61/184,736, filed on Jun. 5, 2009.

(51) Int. Cl.

| | | |
|---|---|---|
| *G06Q 30/06* | (2012.01) | |
| *G06Q 40/02* | (2012.01) | |
| *G07F 7/10* | (2006.01) | |
| *H04M 1/724* | (2021.01) | |
| *G06K 19/073* | (2006.01) | |
| *H04B 5/00* | (2006.01) | |

(52) U.S. Cl.
CPC ......... *G06Q 20/341* (2013.01); *G06Q 20/354* (2013.01); *G06Q 30/06* (2013.01); *G06Q 40/02* (2013.01); *G07F 7/10* (2013.01); *H04B 5/00* (2013.01); *H04M 1/724* (2021.01)

(58) Field of Classification Search
USPC .......................................................... 705/17
See application file for complete search history.

(56) References Cited

U.S. PATENT DOCUMENTS

| | | | |
|---|---|---|---|
| 6,202,927 B1 | 3/2001 | Bashan et al. | |
| 6,641,050 B2 | 11/2003 | Kelley et al. | |
| 6,805,288 B2 | 10/2004 | Routhenstein et al. | |
| 6,934,689 B1 | 8/2005 | Ritter et al. | |
| 7,559,468 B2 | 7/2009 | Kawaguchi | |
| 7,848,736 B2 | 12/2010 | Pousti | |
| 8,320,962 B2 | 11/2012 | Wilson et al. | |
| 9,111,188 B2 | 8/2015 | Goyet | |
| 2002/0153424 A1 | 10/2002 | Li | |
| 2002/0186845 A1* | 12/2002 | Dutta ................... G07F 7/1008 380/247 | |
| 2004/0049451 A1 | 3/2004 | Berardi et al. | |
| 2004/0056083 A1 | 3/2004 | Graf et al. | |
| 2004/0072592 A1 | 4/2004 | Hasegawa | |
| 2005/0157568 A1 | 7/2005 | Teicher | |
| 2006/0086806 A1 | 4/2006 | Conraux et al. | |
| 2006/0186211 A1 | 8/2006 | Kim et al. | |
| 2006/0234778 A1 | 10/2006 | Matsushita et al. | |
| 2006/0283960 A1 | 12/2006 | Top | |
| 2007/0075140 A1 | 4/2007 | Guez et al. | |
| 2007/0123305 A1 | 5/2007 | Chen et al. | |
| 2007/0152035 A1 | 7/2007 | Adams et al. | |
| 2007/0225038 A1 | 9/2007 | Takeda | |
| 2007/0293155 A1 | 12/2007 | Liao et al. | |
| 2008/0051142 A1 | 2/2008 | Calvet et al. | |
| 2008/0058014 A1 | 3/2008 | Khan et al. | |
| 2008/0116264 A1 | 5/2008 | Hammad et al. | |
| 2008/0154735 A1 | 6/2008 | Carlson | |
| 2008/0172317 A1 | 7/2008 | Deibert et al. | |
| 2008/0319794 A1 | 12/2008 | Carlson et al. | |
| 2009/0065571 A1 | 3/2009 | Jain | |
| 2009/0106824 A1 | 4/2009 | Morel et al. | |
| 2009/0143104 A1 | 6/2009 | Loh et al. | |
| 2009/0164322 A1 | 6/2009 | Khan et al. | |
| 2009/0171797 A1 | 7/2009 | Branca, Jr. | |
| 2009/0215385 A1 | 8/2009 | Waters et al. | |
| 2009/0228352 A1 | 9/2009 | Waxman et al. | |
| 2009/0239512 A1 | 9/2009 | Hammad et al. | |
| 2009/0247077 A1 | 10/2009 | Sklovsky et al. | |
| 2009/0313689 A1 | 12/2009 | Nystrom et al. | |
| 2010/0060415 A1* | 3/2010 | Goyet ................ G06K 7/10198 340/5.74 | |
| 2010/0069118 A1 | 3/2010 | Wang | |
| 2010/0102131 A1 | 4/2010 | Skowronek | |
| 2010/0121725 A1 | 5/2010 | Adams et al. | |
| 2010/0211504 A1 | 8/2010 | Aabye et al. | |
| 2010/0274712 A1 | 10/2010 | Mestre et al. | |
| 2010/0291904 A1 | 11/2010 | Musfeldt et al. | |
| 2013/0078921 A1 | 3/2013 | Wilson et al. | |
| 2017/0364913 A1* | 12/2017 | Aabye ................... G06Q 40/12 | |

FOREIGN PATENT DOCUMENTS

| | | | |
|---|---|---|---|
| EP | 0 945 828 A2 | 9/1999 | |
| EP | 1 837 801 A1 | 9/2007 | |
| EP | 1 907 993 A1 | 4/2008 | |
| EP | 2010377 | 7/2009 | |
| EP | 1 891 582 B1 | 10/2012 | |
| EP | 2438688 B1 | 9/2015 | |
| FR | 050 7887 | 6/1919 | |
| KR | 10-2005-0021715 A | 3/2005 | |
| KR | 10-2007-0031131 A | 3/2007 | |
| WO | 2000/33247 A1 | 6/2000 | |
| WO | 2005/096651 A1 | 10/2005 | |
| WO | 2006/138440 A2 | 12/2006 | |
| WO | 2007/012738 A1 | 2/2007 | |
| WO | 2007/124119 A1 | 11/2007 | |
| WO | WO-2008053095 A1 * | 5/2008 | ............ G06F 21/88 |
| WO | 2010/141233 | 12/2010 | |

OTHER PUBLICATIONS

Non-Final Office Action, dated Sep. 19, 2011, U.S. Appl. No. 12/768,677, 10 pages.
Non-Final Office Action, dated Mar. 12, 2012, U.S. Appl. No. 12/768,677, 8 pages.
Notice of Allowance, dated Jun. 12, 2012, U.S. Appl. No. 12/768,677, 7 pages.
Notice of Allowance dated Jul. 20, 2012, U.S. Appl. No. 12/768,677, 5 pages.
Non-Final Office Action, dated Dec. 26, 2014, U.S. Appl. No. 13/684,754, 8 pages.
Notice of Allowance, dated May 28, 2015, U.S. Appl. No. 13/684,754, 5 pages.
Extended European Search Report, EP 10783791.6, dated Apr. 25, 2013, 6 pages.
Extended European Search Report, EP 15180066.1, dated Dec. 21, 2015, 6 pages.
Australian Office Action, Application No. 2010257039, dated Oct. 22, 2012, 5 pages.
Canadian Office Action, Application No. 2,764,353, dated May 30, 2013, 3 pages.
Chinese Office Action, Application No. 201080031013.5, dated Aug. 8, 2013, 26 pages.
EP Office Action dated Sep. 1, 2020 for EP Application No. 19180287.5, 4 pages.

* cited by examiner

CONTACTLESS ENABLEMENT AND DISABLEMENT

CROSS-REFERENCES TO RELATED APPLICATIONS

This application is a continuation of application Ser. No. 14/846,378, filed Sep. 4, 2015, which is a continuation of application Ser. No. 13/684,754, filed Nov. 26, 2012, which is a continuation of application Ser. No. 12/768,677, filed Apr. 27, 2010, which claims the benefit of provisional Application No. 61/184,736, filed Jun. 5, 2009. The above applications are hereby incorporated by reference in their entireties for all purposes.

BACKGROUND

Currently, many magnetic credit or debit cards are updated to have the ability to conduct financial transactions using multiple interfaces such as a contact chip and/or contactless (wireless) RF chip interface, in addition to the magnetic strip interface. This provides for ease of use and also decreases transaction times at merchant locations.

In the case of the contactless interface, a RF (Radio Frequency) integrated circuit is coupled to an antenna and is present on a payment device such as a credit, debit, prepaid card, cellular telephone or personal digital assistant (PDA). It transmits information stored in the card to a card terminal adapted to receive the radio frequency signal. This can only be done in short range distances and occurs when a user brings their card in proximity to the terminal. The card transfers information to the terminal which, in turn, communicates with a payment processing network in order complete the transaction. In addition, the terminal may send updates to the IC chip on the card upon completion of a transaction.

However, despite ease of use, there are some security concerns associated with the contactless cards and wireless transactions. For example, when the card is initially sent to the user in an envelope (or similar situation) the information stored on the card may be skimmed or intercepted by fraudsters through the envelope. Some security measures have been implemented to reduce the chance of unauthorized interception of the data on the RF chips when they are sent to the user. For example, an issuer may use an RF shield to shield a contactless card when it is delivered to the user in the mail. The shield may be directly applied to the card, such as with a metallic sticker, or may be formed on the inner surface of the envelope itself. This prevents the RF chip in the card from communicating with an external device when it is sent to the user in an envelope. However, these shielding techniques add additional cost to the card for the provider and may not be completely effective, especially if the card is intercepted in transit and the shield is removed.

In addition to this problem, a user or issuer may want to use the contactless element of the credit, debit, or prepaid card at certain times after the card is received by the user. For example, when the user is traveling or in a high density area, they may want to disable the wireless communication of their card for their protection. In addition, some users may prefer to have the contactless interface always turned off, preferring only to perform the conventional contact transaction.

Embodiments of the invention address these and other problems, individually and collectively.

BRIEF SUMMARY

Embodiments of the invention are directed to methods and systems for enablement and disablement of a contactless interface on a portable device.

One embodiment of the invention is directed to a method that controls the contactless transmission of data on a portable device. The method includes performing a contact-type transaction using a portable device. The contact-type transaction includes contacting the portable device to a terminal device. When the portable device and the terminal device are in contact with each other, a command is received in a contact transmission between a contact interface on the portable device and the terminal device. The command can be sent to the terminal device through a processing network. The method may also include modifying the configuration data on the portable device where one or more bits in one or more data elements is altered based on the received command. Further, in the method, an application can run on the portable device.

Another embodiment of the invention is directed to a portable device which comprises a contactless interface, a contact interface, a memory element operatively coupled to the contactless and contact interface, an application stored in the memory element; and financial data stored in the memory element. A portable device that has both a contactless and contact chip interface is referred to as a dual-interface portable device. Further, the contactless interface is enabled or disabled depending upon the state of configuration data.

Yet another embodiment of the invention provides a method for controlling an application on a dual interface portable device which authenticates a user of the portable device. The method includes receiving a request from the authenticated user of the portable device and issuing a command to a processing network, which subsequently modifies configuration data on the portable device. The command can be sent through the processing network to a terminal device. Further, the issued command controls the functionality of a contactless interface on the portable device.

Another embodiment of the invention provides a computer readable medium comprising code executable by a processor for implementing a method that comprises receiving commands from an issuer of a portable device at a terminal device. The method further comprises modifying configuration data on the portable device dependent on the received command. An application is run on the portable device which controls the data transmission to a contactless interface of the device dependent on the state of the configuration data.

These and other embodiments of the invention are described in further detail below.

DETAILED DESCRIPTION

Embodiments of the present invention allow for the protection of a portable device having both contact and contactless transaction capabilities. Embodiments of the invention prevent authorized persons from obtaining sensitive data (e.g., account numbers) from the portable device over the contactless interface.

The portable device may include an application which controls the functionality of the contactless interface. The function of the application may depend on variable commands sent from an access device (e.g., a point of sale terminal) that interacts with the portable device during a transaction. The user of the device may first perform a contact transmission between a contact interface on the portable device and a POS terminal device in order to receive a command from a processing network, such as a payment processing network. The command is conveyed through the POS terminal device, which is enabled to communicate with the issuer of the portable device through the processing network. The received command may modify configuration data on the portable device, altering one or more bits in one or more data elements. Accordingly, when the application that controls the contactless interface of the device is run, the contactless interface may be either enabled or disabled.

To control the contactless transmission of data from the portable device to the point of sale (POS) terminal device, the user first performs a contact transaction at a POS terminal device. For example, the dual-interface portable device may make direct contact with an interface in the POS terminal device, such that an integrated circuit (IC) chip in the dual-interface portable device and a processor in the POS terminal are in communication with each other. The IC chip on the dual-interface portable device may include a memory which stores the user's financial information along with additional applications for completing transactions and operating the dual-interface portable device.

During the course of performing the contact transaction, the POS terminal device may receive an automatically generated or user requested command from the issuer of the card which activates, or enables, the contactless interface. The command may be sent through the payment processing network which is in direct communication with the issuer of the portable device. The issuer may be notified by the user of the portable device prior to sending a command, or may automatically send a command after issuance of the portable device (e.g., after the first contact transaction is performed with the dual-interface portable device). In some embodiments, the command may be sent as an update which is received upon completion of a successful transaction at a terminal device.

The command is passed from the POS terminal to the dual-interface portable device in order to modify configuration data within the memory of the IC chip in the dual-interface portable device. As discussed above, this may be sent along with updates at the end of the transaction. The commands allow for one or more data bits within the memory element to be altered as a result of the modified configuration data. For example, in a two byte configurable data element, the first byte may include bits six through one ('000000'), bit seven ('0') and bit eight ('1'). Bit seven controls the semi-permanent disablement and is disabled ('0'), while bit eight controls the temporary disablement and is enabled ('1'). As long as bit seven is disabled, bit eight may be toggled off upon performing the next contact transaction. Thus, the aforementioned example is a stored instruction set which allows for the contactless interface to be temporarily disabled.

The commands received through the terminal device provide different instruction sets to an application, which may also be stored in the memory element. In some embodiments, when the application is run, the contactless interface may be enabled, temporarily disabled or semi-permanently disabled. The application reads bit seven and bit eight in the first data byte of the memory element to determine if the saved information (i.e. financial information) may be wirelessly transferred to a POS terminal during a transaction.

In some embodiments, the disablement of the contactless interface may be performed at the hardware level. In such an embodiment, when the commands are received on the portable device, the antenna element within the RF chip may be disabled. In this case, a null response may be provided upon attempted use of the contactless element.

Exemplary systems and methods using these commands for configuring data on the portable device are provided below.

I. Exemplary Systems

Figure 1:
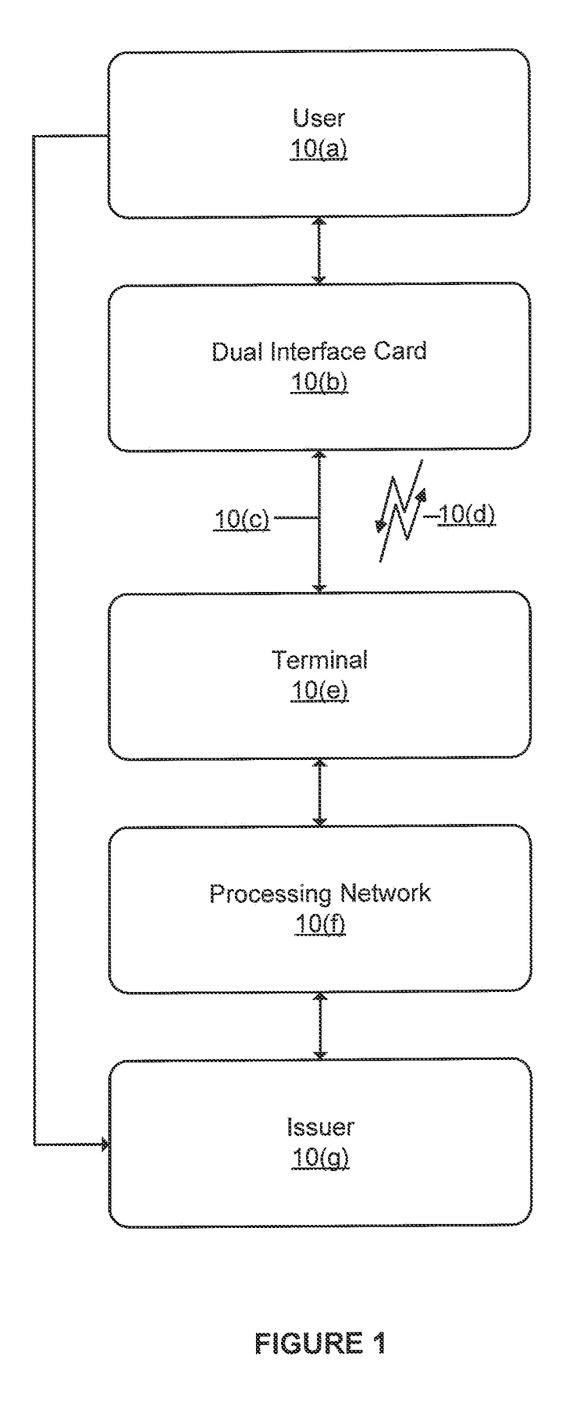
FIG. 1 shows a block diagram of a system that can be used in accordance with some embodiments of the invention.

A system according to an embodiment of the invention is shown in FIG. 1.

Referring to FIG. 1, a user 10(a) having access to a dual-interface card 10(b) is capable of communicating with a card terminal 10(e), using a contact chip connection 10(c) and contactless connection 10(d). The dual-interface card 10(b) is originally shipped to the user 10(a) with disabled contactless element (i.e. the contactless connection 10(d) is disabled. At this time, the dual-interface card 10(b) may communicate with a card terminal 10(e) and engage in a transaction only through the contact chip connection 10(c), which may include inserting the dual-interface card 10(b) inside a slot in the card terminal 10(e).

Issuer 10(g) or the processing network 10(f) can automatically send a command to the card terminal 10(e) so that during the contact chip connection 10(c), the bit eight of the first byte is set to "0". When this bit is set to "0" from "1", the application associated with the contactless element starts operating and causes it to transmit the stored card information thereafter through contactless connection 10(d). Therefore, when the user 10(a) performs a transaction using the contact chip connection 10(c) for the first time, the contactless element is automatically enabled for future transactions.

As used herein, an "issuer" 10(g) is typically a business entity (e.g., a bank) which maintains financial accounts for the user 10(a) and often issues a portable device such as a credit or debit card to the user. A "merchant" is typically an entity that engages in transactions and can sell goods or services, having the card terminal 10(e).

The processing network 10(f) may include data processing subsystems, networks, and operations used to support and deliver authorization services, exception file services, and clearing and settlement services. For example, the transaction processing network may comprise a server computer, coupled to a network interface, and a database of information. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

As noted above, the transaction processing network may include a server computer. A server computer is typically a powerful computer or cluster of computers. For example, the server computer can be a large mainframe, a minicomputer cluster, or a group of servers functioning as a unit. In one example, the server computer may be a database server coupled to a Web server. The transaction processing network may use any suitable wired or wireless network, including the Internet.

II. Exemplary Portable Devices, Access Devices, and Computer Apparatuses

The portable devices according to embodiments of the invention may be in any suitable form. A portable device may be referred to interchangeably as a consumer device, phone or card within the disclosure. Suitable portable, or consumer devices may be hand-held and compact so that they fit into a consumer's wallet and/or pocket (e.g., pocket-sized). They may include smart cards, credit or debit cards (with a dual interface), or any consumer payment device that has both a contactless interface and another communication interface, such as a contact chip interface, cellular communication interface, etc. Accordingly, other examples of portable devices include cellular phones, personal digital assistants (PDAs), pagers, payment cards, security cards, access cards, smart media, transponders, and the like. The portable devices can also be debit devices (e.g., a debit card), credit devices (e.g., a credit card), or stored value devices (e.g., a stored value card).

In embodiments including a contactless element (e.g., a contactless chip and near field communications data transfer element) embedded within a wireless mobile phone or other portable device described above, the contactless element can communicate with a merchant's point of sale (POS) terminal using a short range communication method, such as a near field communications (NFC) capability. Examples of such NFC technologies or similar short range communications technologies include ISO standard 14443, RFID, Bluetooth™ and Infra-red communications methods.

In embodiments including a contactless element (e.g., a contactless chip and near field communications data transfer element) embedded within a wireless mobile phone, the mobile device can use the cellular communications network to send and receive commands to the embedded contactless chip.

Each portable device may comprise a body, and a memory comprising a computer readable medium disposed on or within the body. The memory may store data, and may be in any suitable form including a memory chip, etc. The memory may be used to store data such as user identification or authentication information, user account information, transaction data, etc. Stored financial information may include information such as bank account information, bank identification number (BIN), credit or debit card account number information, account balance information, expiration date, consumer information such as name, date of birth, etc. Note that such data may additionally or alternatively be stored in a secure data storage element, such as secure data storage or a similar secure memory that is part of contactless element. As described, the memory may also contain instructions which when executed by processor implement operations or processes that are part of the operation of the device or of applications installed on the device. In addition, the portable device may also include a processor coupled to the memory, where greater functionality and/or security are desired.

Figure 2:
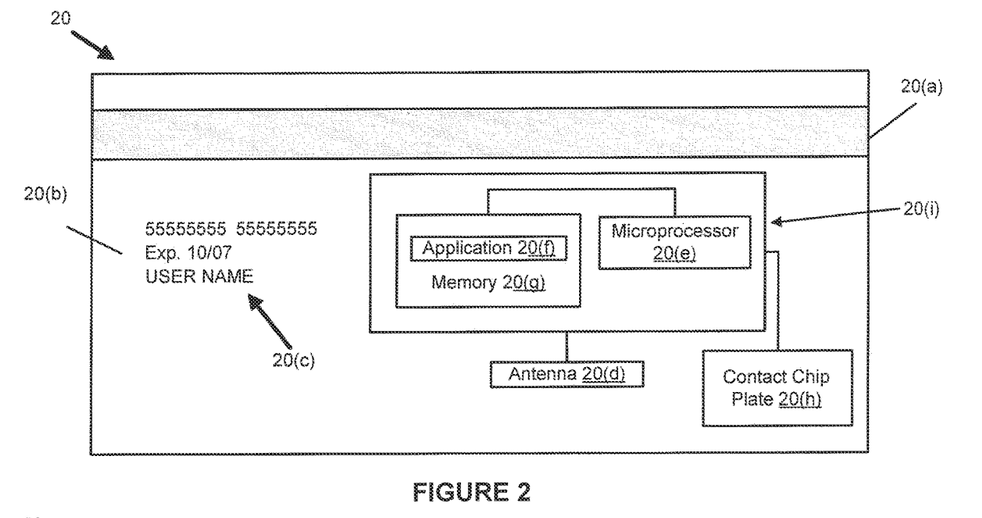
FIG. 2 shows a portable device in the form of a payment card.

FIG. 2 shows one embodiment of a portable device that may be used in an embodiment of the invention. The dual-interface portable device 20 may be in form of a credit, debit, or prepaid card having both a contact interface 20(*h*) and a contactless interface 20(*d*). The contact interface 20(*h*), which may be in the form of a chip plate, allowing the portable device 20 to perform a transaction by having the contact interface to come in direct contact with a second contact interface at a card terminal (or other type of POS terminal or access device). In some embodiments, a secondary contact interface 20(*a*), such as a magnetic stripe can also be located on the portable device 20. Stored card information 20(*b*) including financial data (e.g., an account number) can be sent from the card 20 to the card terminal when they are in contact with each other. The contactless interface 20(*d*) can communicate with the card terminal using a contactless interface at the card terminal. An antenna 20(*d*) coupled to an integrated circuit (IC) chip 20(*i*) may form at least part of a contactless element, which is used to wirelessly transmit the stored card information to the card terminal 10(*e*).

The dual-interface characteristic of the card may be advantageously used to control the ability of the contactless element to function. The application 20(*f*) can control the transmission of data (i.e. financial data) to and from the contactless interface of the portable device. The application's functionality or capabilities may be defined by configuration data in the form of a two-byte data element with configurable values. These configurable values may be alternatively or additionally used to control the operation of the IC chip and antenna or other hardware and/or software. In various embodiments, the application 20(*f*) may discontinue operation, may disconnect with the antenna element or may discontinue data transfer to the contactless interface when the contactless interface is disabled.

Accordingly, the application 20(*f*), may be implemented in the form of one or more of software, firmware, or hardware, dependent on the portable device. The application 20(*f*) is used to implement various functions desired by the user, where such functions may include, but are not limited to, eCommerce transaction operations, payment transaction operations, etc. As shown in FIG. 2, the application 20(*f*) may exchange data with memory and may also be capable of exchanging data with portable device circuitry. A typical application 20(*f*) for the purposes of the present invention is a contactless transaction application that enables a user to make a transfer data during a NFC transaction. In such an example, memory 20(*g*) may also contain authentication data, consumer identification data, transaction record data, account balance data, etc. The application 20(*h*) is typically stored as a set of executable instructions in memory 20(*g*), which may include data storage in the form of a two data byte element as previously discussed. A microprocessor 20(*e*) accesses memory 20(*g*) to load and unload the instructions and data as needed to execute the instructions to perform the functions of the applications.

Figure 3:
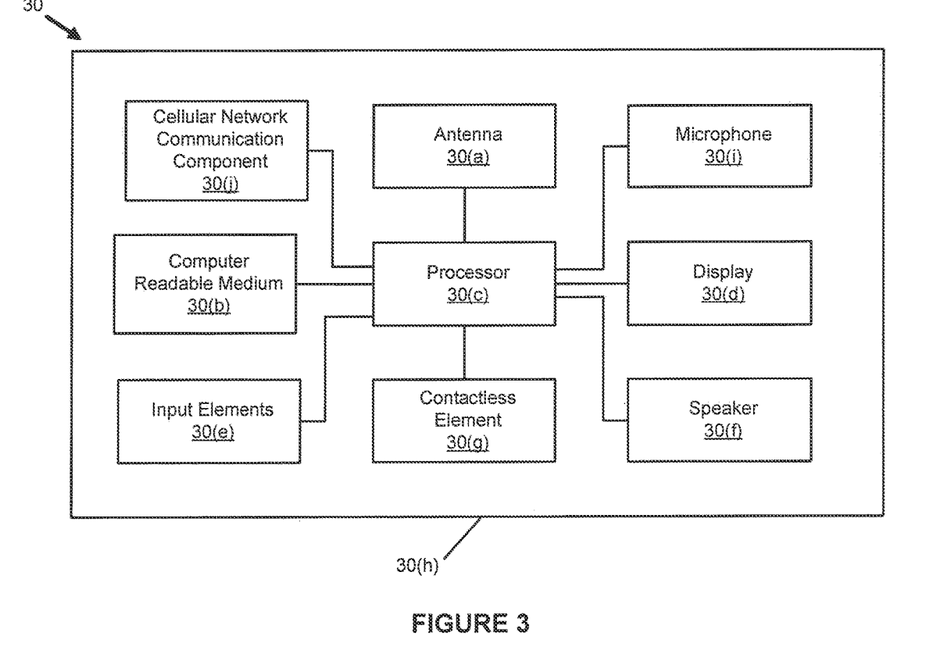
FIG. 3 shows a portable device in the form of a phone.

In an alternative embodiment, FIG. 3 shows a block diagram showing components in a portable device in the form of a cellular or mobile communication device that can be used in embodiments of the invention. The exemplary wireless phone 30 may comprise a computer readable medium 30(*b*), a cellular network communication component 30(j) and a body 30(h). The computer readable medium 30(b) may be present within the body 30(h), or may be detachable from it. The cellular network component 30(j) may act as a communication interface, similar to the contact interface on the payment card, to provide updates to the portable device. The body 30(h) may be in the form a plastic substrate, housing, or other structure. The computer readable medium 30(b) may be in the form of (or may be included in) a memory that stores data (e.g., issuer account numbers and other elements of split payment data) and may be in any suitable form including a memory chip, etc. The memory preferably stores information such as financial information and applications which control the contactless interface functionality and other functions within the device. Financial information may include information such as bank account information, a bank identification number (BIN), credit or debit card number information, account balance information, expiration date, consumer information such as name, date of birth, etc. Any of this information may be transmitted by the phone 30.

The phone 30 may further include a contactless element 30(g), which is typically implemented in the form of a semiconductor chip (or other data storage element) with an associated wireless transfer (e.g., data transmission) element, such as an antenna. Contactless element 30(g) is associated with (e.g., embedded within) phone 30 and data or control instructions transmitted via a cellular network may be applied to contactless element 30(g) by means of a contactless element interface (not shown). The contactless element interface functions to permit the exchange of data and/or control instructions between the mobile device circuitry (and hence the cellular network) and an optional contactless element 30(g).

Contactless element 30(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™ infra-red, or other data transfer capability that can be used to exchange data between the phone 30 and an interrogation device. Thus, the phone 30 is capable of communicating and transferring data and/or control instructions via both cellular network and near field communications capability.

The phone 30 may also include a processor 30(c) (e.g., a microprocessor) for processing the functions of the phone 30 and a display 30(d) to allow a user to see phone numbers and other information and messages. The phone 30 may further include input elements 30(e) to allow a user to input information into the device, a speaker 30(f) to allow the consumer to hear voice communication, music, etc., and a microphone 30(i) to allow the user to transmit her voice through the phone 30. The phone 30 may also include an antenna 30(a) for wireless data transfer (e.g., data transmission).

In some embodiments, the phone 30 may also include a contact interface (not shown), which is in communication with the processor 30(c) to allow the phone 30 to communicate with a processor in a POS terminal using a contact-type interaction.

Figure 4:
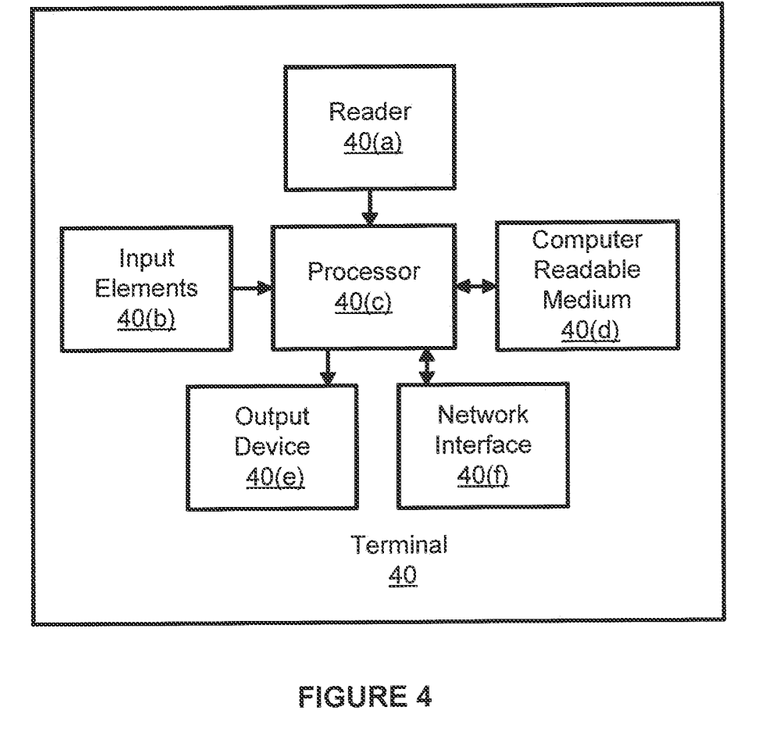
FIG. 4 shows a block diagram of an access device.

FIG. 4 shows a block diagram of a terminal which may be an access device 40 according to an embodiment of the invention. Access device may be utilized interchangeably with access terminal, point of sale (POS) device or terminal, reader and terminal within the present disclosure. The terminal 40 comprises a processor 40(c) operatively coupled to a computer readable medium 40(d) (e.g., one or more memory chips, etc.), input elements 40(b) such as buttons or the like, one or more readers 40(a) (e.g., a contact chip reader, a contactless reader, a magnetic stripe reader, etc.), an output device 40(e) (e.g., a display, a speaker, etc.) and a network interface 40(f). A housing may house one or more of these components.

The computer readable medium 40(d) may comprise instructions or code, executable by a processor. The instructions may include instructions for receiving a command set from a server computer, wherein the server computer generates a command based on communication with the user of the portable device or automatically generated after issuance of the device. Further, the instructions may include instructions for sending the command to a portable device upon making contact with that device.

III. Exemplary Methods

Methods according to embodiments of the invention can be described with respect to FIGS. 5-8.

The methods provided herein can include configuring bits of a two data byte element within the memory of a RF chip located on a portable device, such as a credit card or cellular telephone. In particular, the embodiments provide three combinations of bits seven and eight on the first data byte of the element. The combinations allow for a contactless interface located within a dual interface portable device to be enabled, temporarily disabled and semi-permanently disabled.

The contactless interface is enabled when both bit seven is "0" and bit eight is "0". The interface is temporarily disabled when bit seven is "0" and bit eight is "1". Finally, bit seven restricts the reset of the contactless functionality disable bit (bit eight). Accordingly, when bit seven is "1" and bit eight is either "1" or "0" the contactless interface is semi-permanently disabled. Exemplary methods for configuration of these bits are further described in the following paragraphs.

Figure 5:
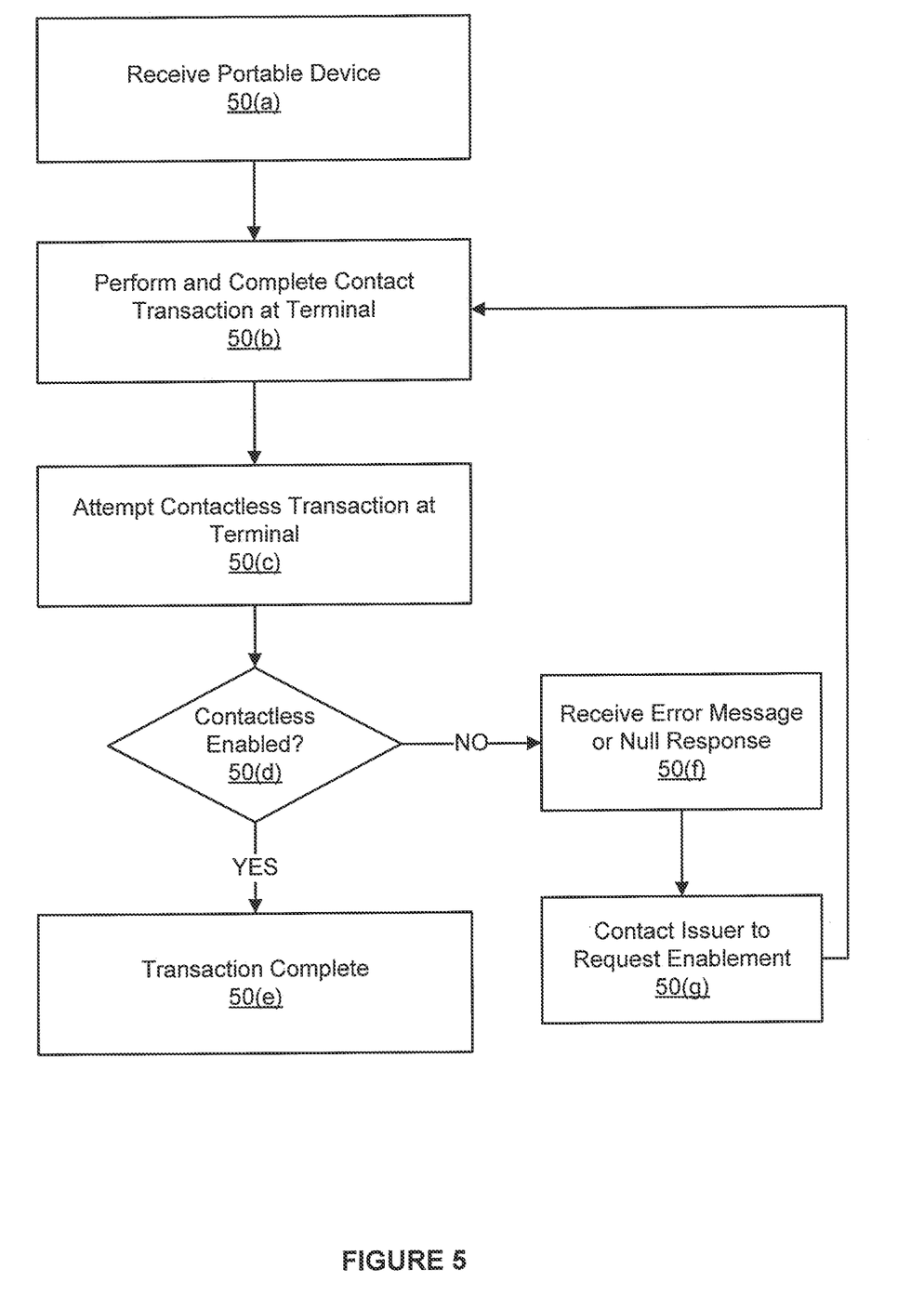
FIG. 5 shows a flow diagram illustrating a contactless enablement method according to an embodiment of the invention.

Referring to FIG. 5, an embodiment of the invention is shown wherein the portable device is received by a user 50(a) and the contactless interface is temporarily disabled, bit seven is "0" and bit eight is "1". For example, the user may receive the portable device through the mail or download an application on a cellular device and enter their financial information for the first time. The user then attempts to enable the contactless interface through contact usage of the device at a POS terminal, or in the case of a cellular device, receives an update from the issuer over the cellular network.

To complete a transaction, the issuer is authenticated and the transaction is approved by both the issuer and the merchant where the POS terminal is located. Issuer authentication is the process to authenticate that the issuer successfully received the online message and the issuer response is genuine. Such authentication may also be used during contactless transactions when/if the contactless interface is enabled. Thus, prior to receiving and processing the command for contactless enablement, a successful issuer authentication and transaction occurs.

This issuer authentication process may be performed as part of an authorization process for a transaction using the POS terminal or it may be part of a process that is separate from a typical transaction authorization process. In either case, an appropriate message (e.g., an authorization request message) is generated by a processor in the POS terminal and it sent to the issuer. The issuer may then send an appropriate message including appropriate commands to the POS terminal. In some embodiments, the message may be an authorization response message that passes from the POS terminal to the issuer through an acquirer and a payment processing network. It may request approval from the issuer to proceed with the transaction. The issuer may then send back an authorization response message indicating whether or not the transaction is authorized. This authorization response message may include the commands that can enable or disable a contactless interface in the portable device.

If the aforementioned requirements are achieved, the POS terminal sends the command that is received from the issuer to the portable device upon completion of the transaction. The command received from the POS terminal is processed by a processor on the portable device and modifies one or more bits within bytes of memory located in the device. These bits may be toggled between one "1" and zero "0" in order to activate and deactivate the contactless element by sending various instructions to the processor when an application is run on the portable device. Accordingly, the bits may be altered in specific combinations in order to control functionality of the device through an application. As discussed previously, such modification of the configuration data may also control the functionality of the device on a hardware level, if desired.

In some embodiments, the commands may be automatically sent to the POS terminal from the issuer, such as when a card is initially issued. In such a case, a user receives the newly issued portable device 50(a) and may activate it through usage at a POS terminal as shown in FIG. 5. In the case of a portable device such as a cellular telephone, the user may download and/or enter financial information into a payment application located on the device and then receive an update from the issuer over the cellular network which activates the contactless interface through the application. Such an exemplary system is provided in FIG. 8 and is described further detail in the following paragraphs.

Accordingly, to control the application, bit eight of a first byte of the data element is used to enable/disable the contactless functionality. When an issuer issues the dual-interface portable device, bit eight of the first byte may be initially set to "1". An application stored in the memory element of the IC chip is configured in such a way that if this bit is set to "1", the application may either stop the wireless transmission altogether and send a null response or stop information flow through the wireless transmission and send a pre-configured error message when in proximity of a card terminal. Therefore, the contactless element can be disabled and the portable device can be safely shipped to a user. After a user has the portable device in possession, the issuer can enable the contactless interface during the next contact chip connection.

Referring back to FIG. 5, after making contact between the portable device interface and the POS terminal 50(b), the configuration data on the portable device is either modified or remains unchanged. In the case of a portable device such as a card having an IC chip, the modification of the configuration data is done through data exchange with the contact interface of the card and the POS or access terminal. In alternative embodiments, with the portable device being a cellular telephone, personal digital assistant (PDA) or similar device, the cellular network may transmit the commands to the portable device during the next connection made with the network. In such an embodiment, the commands may be exchanged with or directly applied to the application controlling the contactless interface. The device may then receive a notification, which may be sent similar to a text message or a push notification, indicating that the command was received and that the contactless interface is enabled.

Next, the user may attempt to make a contactless transaction 50(c) with the portable device at another merchant location or at a different time. If the contactless element is enabled 50(d) after the first contact transaction performed 50(b), the user was able to complete a contactless transaction 50(e). The contactless interface will remain enabled unless the user contacts the issuer to disable it.

However, if the user's contact transaction 50(b) did not enable the contactless element 50(d) and the user attempts to utilize the contactless interface 50(c), the user may be given an error message 50(f) provided at the POS terminal device and/or by the merchant. Alternatively, the user may receive a null response 50(f), meaning at least bit eight is "1". In addition, bit seven could be "1" which, as described above, will semi-permanently disable the contactless interface until specific commands from the issuer are provided. Accordingly, upon receiving an error message or null response, the user may then contact the issuer 50(g) to enable the contactless interface. Once a request is received, the issuer sends the command through the transaction processing network, to the merchant location and the POS terminal. The user will then need to perform another contact transaction at a POS terminal device 50(b) in order to enable the contactless interface, setting both bit seven and bit eight equal to "0". Again, once enabled, the contactless interface will remain enabled unless the user contacts the issuer to disable it.

Figure 6:
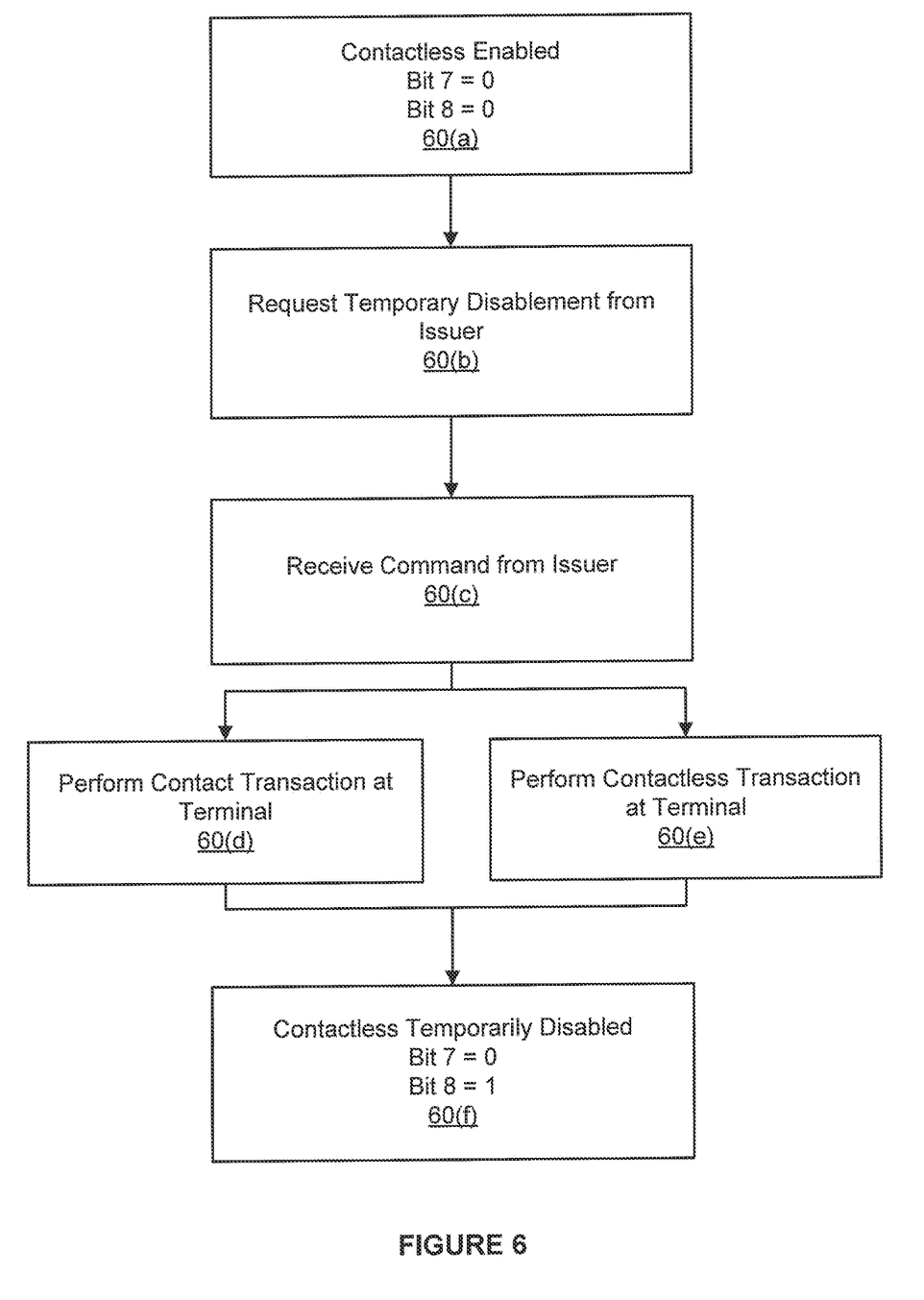
FIG. 6 shows a flow diagram illustrating a contactless disablement method according to an embodiment of the invention.

Referring now to FIG. 6, another embodiment is provided wherein the user may wish to temporarily disable the contactless interface until the next contact transaction. For example, the user may be traveling or the portable device may be temporarily misplaced. Accordingly, the user initially has a portable device where both the contact interface and contactless interface are enabled 60(a), bit seven is "0" and bit eight is "0".

In order to temporarily disable the portable device, the user first contacts the issuer of the portable device and requests disablement 60(b) of the contactless functionality of the portable device. This may be done in person at the issuing institution, or through voice or online communication dependent on the requirements of the issuing entity. Further, the user may be required to be authenticated prior to the issuer entering the request. Accordingly, the user may first be identified by the issuer and then the request is entered. Once the request is entered, the command is sent by the issuer through the transaction processing system. During the next transaction performed by the user, the command is sent to the portable device and the configuration data is modified. Since both contactless and contact interfaces are currently enabled on the portable device, either interface may be utilized to complete the transaction and to modify the configuration data. Accordingly, upon performing a contact 60(d) or contactless transaction 60(e), bit eight changes from "0" to "1" and bit seven remains "0."

The contactless interface can be temporarily disabled 60(f), giving a null or error response if the user attempts to use that interface. However, upon performing the next successful contact transaction, the contactless interface will be automatically enabled again. Bit eight changes back to "0" and bit seven remains at "0". Therefore, the user has the ability to request the disablement of the contactless element until the next transaction.

Figure 7:
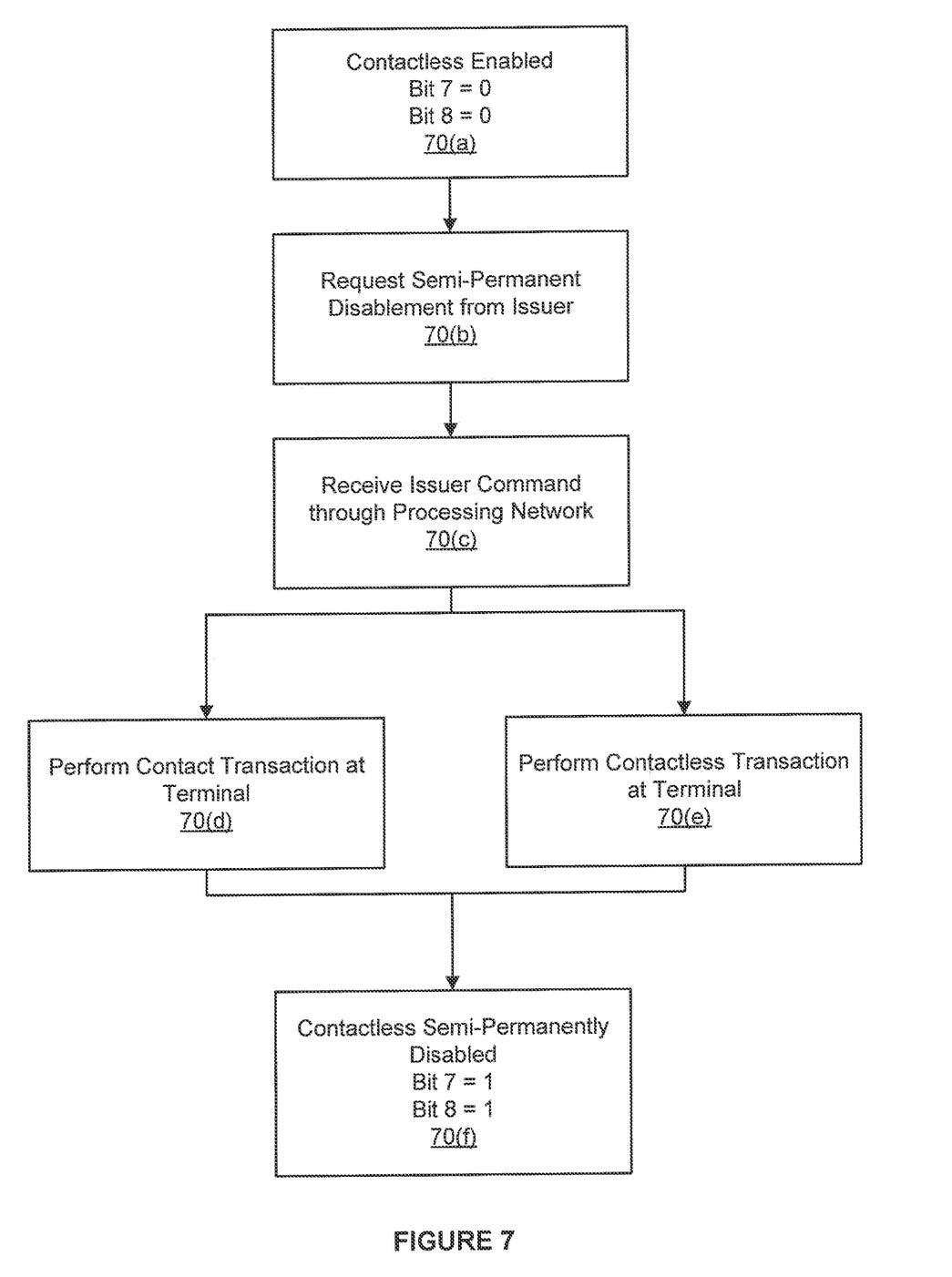
FIG. 7 shows a flow diagram illustrating a contactless disablement method according to an embodiment of the invention.

Referring now to FIG. 7, yet another embodiment of the present invention is illustrated wherein a user desires semi-permanent disablement of the contactless interface. At present, the user's portable device has both contact and contactless interfaces enabled, bit seven is "0" and bit eight is "0". Similar to the process in FIG. 6, the user first contacts the issuer in order to request disablement. Alternatively, the user may contact the payment processing network, such as VisaNet™, in order to disable the contactless interface portable device. However, this is dependent on the agreement established between the processing network, the issuer and the user, and may only be possible through the issuer in some instances.

Once the user contacts the issuer to semi-permanently disable the contactless interface 70(*b*), the issuer authenticates the user and then submits the commands through the payment processing network 70(*c*). During the next contact transaction 70(*d*) or contactless transaction 70(*e*) at the POS terminal, the commands are sent to the portable device and the configuration data is modified. In this case, bit seven of the first byte may be used to control the setting of the bit eight. In other words, when bit seven is set to "1", the application within the portable device does not allow the value of bit eight to change from "1" to "0". The application monitors the value of bit seven, and unless the value of bit seven is set to "0", the value of bit eight is read as "1" regardless of any automatic command that instructs the change of bit eight from "1" to "0".

At this point, the contactless interface is semi-permanently disabled 70(*f*) and both bit seven is "1" and bit eight is "1". Accordingly, the user may perform either a contact transaction or a contactless transaction thereafter, and a null or error response is received when the contactless interface is utilized. Therefore, the user has the ability to request the disablement of the contactless element until a request is submitted to issuer to enable it.

The only way in which the user may enable the contactless interface again is by contacting the issuer and requesting enablement. Once the request is submitted to the issuer, a new command is sent through the processing network, and the user performs a contact transaction in order to enable the contactless interface of the portable device. In one embodiment, the user may request for temporary disablement of the contactless interface directly following semi-permanent disablement. In this embodiment, the issuer sends a command through the processing network which is received at the POS terminal device. Once the user performs a contact transaction, bit seven changes from "1" to "0" and bit eight remains "1". Accordingly, the user will have to perform two contact transactions prior to enabling the contactless interface again.

Figure 8:
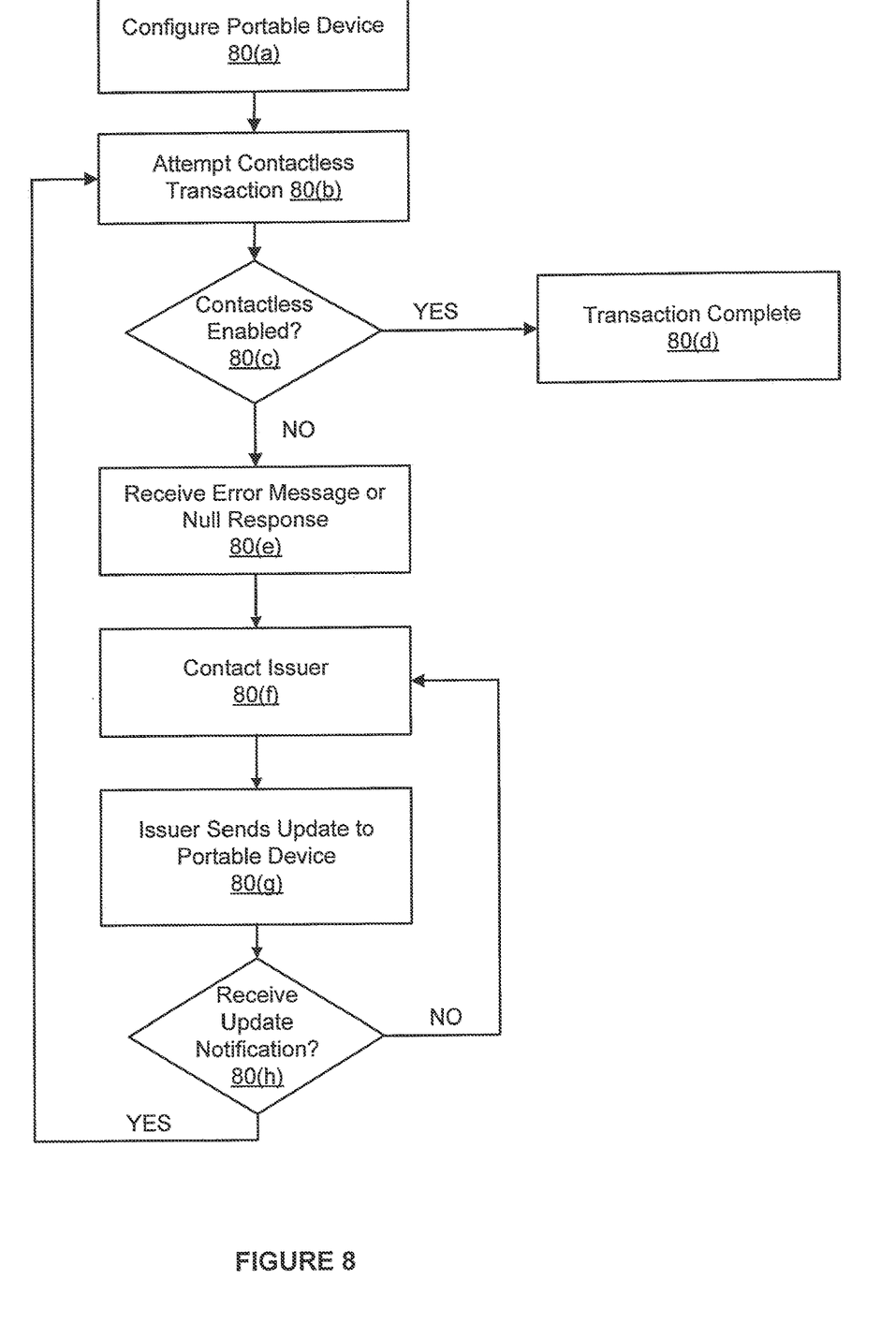
FIG. 8 shows a flow diagram illustrating a contactless enablement method on a mobile communication device according to an embodiment of the invention.

In yet another embodiment, a mobile communication device, such as a cellular telephone, is utilized as the portable device. The phone may include an additional module implemented in the form of a semiconductor chip, such as an RF chip, which may be adhered to the device or directly embedded therein. When an issuer provides financial data for a bank account, credit card, debit card or other payment instrument, the user may download a payment application on the phone or simply input the data related to that payment instrument. Accordingly, the user first configures the device in order for usage during a transaction 80(*a*). Once the data is stored within the portable device, an application is run which controls the transfer of the data through the contactless interface.

Upon configuration 80(*a*), the issuer may initially decide to activate the contactless interface, for example, if all information entered into the phone is valid and confirmed. In some embodiments, additional steps and/or information may be required upon initial configuration for immediate activation. The user may then attempt a contactless transaction at any POS, or access terminal 80(*b*). If the contactless is enabled 80(*c*), the user may successfully complete the transaction 80(*d*). Accordingly, the contactless interface is enabled and bit seven is "0" and bit eight is "0".

In another embodiment, initial configuration of the phone 80(*a*) may not automatically activate contactless interface. In such an embodiment, the user may attempt a contactless transaction 80(*b*) and receive a null or error response, indicating an unsuccessful transaction attempt 80(*c*). In this case, either or both bit seven and bit eight may be "1", dependent on the initial settings of the contactless feature as provided by the issuer. After such a response is received, the user may then contact the issuer 80(*f*) in order to activate the contactless interface.

In the present embodiment, the phone communicates on both the mobile network and via near field communication (NFC). Thus, the issuer may send the command to enable the contactless interface through the mobile network. The user may then receive a message from the issuer 80(*h*) in the form of a short message service (SMS)/text message, a push notification, an email or similar type of notification message indicating that the contactless interface is enabled. When the commands are received by the phone, bit seven is set to "0" and bit eight is set to "0". Therefore, once the application runs, the stored data may be transmitted through the contactless connection 80(*c*) to complete a contactless transaction 80(*d*) thereafter. Accordingly, the user ultimately has control over enablement and disablement of the contactless element.

Alternatively, the issuer may send the update, or command, to the phone and the user may then need to perform a contact transaction in order for the contactless interface to be enabled. In this embodiment, the issuer may include these instructions in the update notification which is sent to the user of the phone. In such an embodiment, the commands may only be received through the POS terminal and not through the mobile network.

Finally, if the user attempts a contactless transaction after contacting the issuer 80(*f*) and never receives any notification 80(*h*) regarding contactless interface enablement, the contactless may still not be enabled. At this point, the user contacts the issuer again 80(*f*) and request enablement. Contacting the issuer may be as simple as sending a message or request through a payment application stored on the phone, which communicates with the issuer via a POS terminal through contact transaction or through the mobile network and a payment processing network such as VisaNet™. Alternatively, the user may need to contact the issuer through another direct communication means. Once the request is received by the issuer, the commands may be sent to enable the contactless interface of the portable device via an update sent through the mobile network as described in the previous embodiments.

Embodiments of the invention have a number of technical advantages. Embodiments of the invention prevent unauthorized users from surreptitiously obtaining sensitive data from a portable device via a contactless interface in the portable device and the ability to enable and disable the contactless interface at the discretion of the user and/or issuer. This can reduce the number of fraudulent transactions, and can also speed up transaction processing since fewer potentially fraudulent transactions are conducted.

Specific details regarding some of the above-described aspects are provided below. The specific details of the specific aspects may be combined in any suitable manner without departing from the spirit and scope of embodiments of the invention.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A server computer comprising:
   a processor; and
   a non-transitory computer-readable medium comprising code, executable by the processor, to implement a method comprising:
   receiving a first authorization request message, from a first terminal with a contact reader, for a contact payment transaction with a portable device comprising a contact interface and a contactless interface; and
   responsive to the first authorization request message, transmitting a first authorization response message comprising an indication whether or not the payment transaction is authorized and a command to enable the contactless interface of the portable device, wherein the indication and the command are sent together, and responsive to the command,
   thereby causing the contactless interface to be enabled to conduct a contactless transaction between the portable device and a second terminal with a contactless reader.

2. The server computer of claim 1, wherein:
   the command comprises an instruction to change a bit on the portable device;
   the server computer corresponds to one of a processing network or an issuer of the portable device; and
   the portable device comprises one of: a card or a mobile device comprising an application for transmitting financial data.

3. The server computer of claim 1, wherein the command is automatically generated by the server computer.

4. The server computer of claim 1, wherein the command is generated responsive to receiving a request to enable contactless operation of the portable device.

5. The server computer of claim 1, wherein the method further comprises:
   receiving a request to disable contactless operation of the portable device;
   receiving a second authorization request message; and
   responsive to the second authorization request message, transmitting a second authorization response message comprising a command to disable the contactless interface of the portable device;
   thereby causing the contactless interface to thereafter be disabled from conducting contactless transactions between the portable device and terminals with contactless readers.

6. The server computer of claim 5, wherein the disablement of the contactless interface is temporary, and wherein the method further comprises automatically re-enabling the contactless interface upon performing a next contact transaction by:
   receiving a third authorization request message; and
   responsive to the third authorization request message, transmitting a third authorization response message comprising an indication whether or not the payment transaction is authorized and a command to re-enable the contactless interface of the portable device;
   thereby causing the contactless interface to thereafter be enabled for conducting contactless transactions between the portable device and terminals with contactless readers.

7. The server computer of claim 1, wherein the method further comprises:
   receiving a second authorization request message, from the second terminal with the contactless reader; and
   responsive to the second authorization request message, transmitting a second authorization response message to the second terminal with the contact reader to complete a contactless payment transaction with the portable device.

8. The server computer of claim 1, wherein the method further comprises:
   transmitting the first authorization request message to an issuer of the portable device; and
   receiving the first authorization response message from the issuer of the portable device.

9. A method comprising:
   receiving, by a server computer, a first authorization request message, from a first terminal with a contact reader, for a contact payment transaction with a portable device comprising a contact interface and a contactless interface; and
   responsive to the first authorization request message, transmitting, by the server computer, a first authorization response message comprising a command to enable the contactless interface of the portable device, and responsive to the command,
   thereby causing the contactless interface to be enabled to conduct a contactless transaction between the portable device and a second terminal with a contactless reader.

10. The method of claim 9, wherein the command comprises an instruction to change a bit on the portable device.

11. The method of claim 9, wherein the server computer corresponds to one of: a processing network or an issuer of the portable device; and wherein the portable device comprises one of: a card or a mobile device comprising an application for transmitting financial data.

12. The method of claim 9, wherein the command is automatically generated by the server computer.

13. The method of claim 9, wherein the command is generated responsive to receiving a request to enable contactless operation of the portable device.

14. The method of claim 9, further comprising:
receiving a request to disable contactless operation of the portable device;
receiving a second authorization request message; and
responsive to the second authorization request message, transmitting a second authorization response message comprising a command to disable the contactless interface of the portable device;
thereby causing the contactless interface to thereafter be disabled from conducting contactless transactions between the portable device and terminals with contactless readers.

15. The server computer of claim 14, wherein the disablement of the contactless interface is temporary, and wherein the method further comprises automatically re-enabling the contactless interface upon performing a next contact transaction by:
receiving a third authorization request message; and
responsive to the third authorization request message, transmitting a third authorization response message comprising an indication whether or not the payment transaction is authorized and a command to re-enable the contactless interface of the portable device;
thereby causing the contactless interface to thereafter be enabled for conducting contactless transactions between the portable device and terminals with contactless readers.

16. The method of claim 9, further comprising:
receiving a second authorization request message, from the second terminal with the contactless reader; and
responsive to the second authorization request message, transmitting a second authorization response message to the second terminal with the contact reader to complete a contactless payment transaction with the portable device.

17. The method of claim 9, further comprising:
transmitting, by the server computer, the first authorization request message to an issuer of the portable device; and
receiving, by the server computer, the first authorization response message from the issuer of the portable device.

18. A method comprising:
receiving, by a server computer, a request to disable contactless operation of a portable device comprising a contact interface and a contactless interface;
receiving, by the server computer, an authorization request message, from a terminal, for a payment transaction with the portable device; and
responsive to the authorization request message, transmitting, by the server computer, an authorization response message comprising an indication whether or not the payment transaction is authorized and a command to disable the contactless interface of the portable device, wherein the indication and the command are sent together, and responsive to the command,
thereby causing the contactless interface to be disabled from conducting contactless transactions between the portable device and contactless readers.

19. The method of claim 18, wherein the command comprises an instruction to change a bit on the portable device.

20. The method of claim 18, wherein the disablement of the contactless interface is temporary, and wherein the method further comprises automatically re-enabling the contactless interface upon performing a next contact transaction by:
receiving a second authorization request message; and
responsive to the second authorization request message, transmitting a second authorization response message comprising an indication whether or not the payment transaction is authorized and a command to re-enable the contactless interface of the portable device;
thereby causing the contactless interface to thereafter be enabled for conducting contactless transactions between the portable device and contactless readers.

* * * * *

UNITED STATES PATENT AND TRADEMARK OFFICE
CERTIFICATE OF CORRECTION

PATENT NO. : 11,062,298 B2
APPLICATION NO. : 16/205699
DATED : July 13, 2021
INVENTOR(S) : David William Wilson, Omar Rifaat and Hao Ngo Page 1 of 1

It is certified that error appears in the above-identified patent and that said Letters Patent is hereby corrected as shown below:

In the Claims

Column 15, Claim 15, Line 21 please remove "The server computer of" and insert -- The method of --

Signed and Sealed this
Nineteenth Day of April, 2022

Katherine Kelly Vidal
*Director of the United States Patent and Trademark Office*